(12) United States Patent
Schoepp

(10) Patent No.: US 8,436,747 B2
(45) Date of Patent: May 7, 2013

(54) VEHICLE ILLUMINATION SYSTEM

(75) Inventor: Harald Schoepp, Ettlingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1010 days.

(21) Appl. No.: 12/188,425

(22) Filed: Aug. 8, 2008

(65) Prior Publication Data

US 2009/0072996 A1    Mar. 19, 2009

(30) Foreign Application Priority Data

Aug. 8, 2007    (EP) .................................. 07 015 583

(51) Int. Cl.
*G08G 1/16*    (2006.01)

(52) U.S. Cl.
USPC ........... 340/903; 340/435; 340/436; 340/438; 340/815.45; 701/45; 701/301

(58) Field of Classification Search .................. 340/903, 340/435, 436, 438, 425.5, 815.45, 988, 815.4; 701/29, 45, 301, 1, 300
See application file for complete search history.

(56) References Cited

U.S. PATENT DOCUMENTS

| | | | | |
|---|---|---|---|---|
| 5,826,216 | A * | 10/1998 | Lyons et al. | 702/143 |
| 6,411,204 | B1 * | 6/2002 | Bloomfield et al. | 340/467 |
| 6,765,495 | B1 | 7/2004 | Dunning et al. | |
| 6,825,455 | B1 | 11/2004 | Schwarte | |
| 7,190,260 | B2 * | 3/2007 | Rast | 340/479 |
| 7,961,086 | B2 * | 6/2011 | Bradley | 340/468 |
| 2002/0029103 | A1 | 3/2002 | Breed et al. | |
| 2006/0155469 | A1 * | 7/2006 | Kawasaki | 701/301 |
| 2006/0203505 | A1 | 9/2006 | Griesinger et al. | |

FOREIGN PATENT DOCUMENTS

| | | | |
|---|---|---|---|
| DE | 20209916 U1 | | 10/2002 |
| DE | 10138531 A1 | | 3/2003 |
| DE | 102006058156 | * | 12/2006 |
| DE | 102005058503 A1 | | 6/2007 |
| DE | 10354714 B4 | | 10/2007 |
| EP | 1159636 B1 | | 12/2001 |
| JP | 2007131213 | | 5/2007 |

OTHER PUBLICATIONS

Fritzsche, et al.; Vehicle Occupancy Monitoring with Optical Range-Sensors; IEEE Intelligent Vehicles Symposium; Jun. 14-17, 2004; Parma, Italy, pp. 90-94.

* cited by examiner

*Primary Examiner* — Hung T. Nguyen
(74) *Attorney, Agent, or Firm* — O'Shea Getz P.C.

(57) ABSTRACT

A vehicle illumination system includes a light source emitting light for illuminating the vehicle surroundings or the vehicle interior or both, and a modulation unit modulating the emitting of light of the light source, where the emitted light is modulated with a frequency that is high enough so that the modulation of the light is substantially not perceivable by a person.

25 Claims, 5 Drawing Sheets

VEHICLE ILLUMINATION SYSTEM

RELATED APPLICATIONS

This application claims priority of European Patent Application Serial Number 07 015 583.3, filed on Aug. 8, 2007, titled VEHICLE ILLUMINATION SYSTEM, which application is incorporated in its entirety by reference in this application.

BACKGROUND OF THE INVENTION

1. Field of the Invention

The present invention relates to a vehicle illumination system. In particular, the invention relates to a vehicle illumination system that provides illumination not only for the vehicle but also for other vehicle systems such as a range finding system or a data transfer system.

2. Related Art

In modern vehicles, systems are often provided that assist the driver. An example of such a system is an adaptive cruise control that detects the distance of the vehicle to a vehicle driving in front. If the distance to the vehicle in front decreases, the driver assistance system automatically slows down the vehicle. Such a system needs to accurately determine the distance to the vehicle in front. For a distance determination, three-dimensional (3D) cameras working with the time-of-flight principle may be used. A range finding device using a modulated light source is known from EP 1 159 636 B1, in which a one- or two-dimensional array of light sources and corresponding detectors are used. The German patent application DE 101 38 531 A1 describes a 3D range finding device that employs pulsed illumination and a CMOS-sensor for time-of-flight determination. Furthermore, photonic mixer devices (PMD) are known for recording images with range information, e.g., the PMD [Vision] A2 3D video range camera of PMD Technologies, which uses light emitting diodes at 870 nm with a frequency modulation of 1 to 16 MHz. Furthermore, a solid state time-of-flight range camera is produced by the Swiss Center for Electronics and Microtechnology Inc. (CSEM), e.g., the Swiss Ranger SR-3000, which uses infrared light modulated at 20 MHz for illumination. These and similar systems can be integrated in vehicles to determine the distance to obstacles or other vehicles. These distance measurement systems rely on modulated light that is emitted by a light source and reflected by the obstacle. In vehicles with conventional illumination systems, additional illumination systems have to be integrated for providing the high frequency modulated light, which is necessary for range finding. The integration of such an additional illumination system is often very difficult as suitable space is often not available. If such a system is for example integrated behind the radiator grille, it is necessary to provide a multitude of different illumination systems as the radiator grilles of different vehicle manufacturers often differ substantially. Accordingly, it is very costly to provide a vehicle with a range finding device comprising an additional illumination system.

Furthermore, for driver assistance systems, it is desirable to exchange information between vehicles. At present, there is no system that can be easily integrated in a vehicle without high costs and that enables an exchange of information between vehicles. European patent application EP 1 786 174 A1 discloses a data transfer system that transfers data such as music, videos or games between vehicles using a wireless local area network. In such a system, transmitters and receivers as well as processors have to be provided, and establishing a local area connection between vehicles may not always be possible due to security restrictions that are in place to prevent misuse of such a system. Data transfer systems are known that use modulated infrared light to transfer the data. Such systems include, e.g., remote controls transferring information to a receiver or mobile telephones and which may communicate to each other through an infrared port. These systems generally use special units for emitting modulated infrared light. Vehicles may be equipped with an optical remote control system for opening the doors of the vehicle, but these systems generally comprise infrared light emitting diodes in a mobile sending unit and receptors on the vehicle. These systems are at present not suitable to exchange information between vehicles. Furthermore, additional infrared sending units would have to be integrated in the vehicle, which again would require space and additional costs.

Accordingly, there is a need to provide a compact, multifunctional and cost efficient illumination system in a vehicle. Particularly, there is a need to provide an illumination system that provides an illumination of the vehicle as well as an illumination for a range finding system and/or a data transfer system.

SUMMARY

According to one implementation, a vehicle illumination system is provided. The vehicle illumination system may include a light source and a modulation unit. The light source may be configured for emitting light for illuminating surroundings of a vehicle, an interior of the vehicle, or both the surroundings and the interior. The modulation unit may be configured for modulating the emitting of the light of the light source, where the emitted light is modulated with a frequency which is high enough so that the modulation of the light is substantially not perceivable by a person.

According to another implementation, a method for illuminating a vehicle is provided. The method may include illuminating surroundings of the vehicle, an interior of the vehicle, or both the surroundings and the interior, with light emitted by a light source. The emitting of light of the light source is modulated by utilizing a modulation unit. The emitted light is modulated with a frequency that is high enough so that the modulation of the light is substantially not perceivable by a person.

According to another implementation, a vehicle range finding system is provided. The vehicle range finding system may include a light source, a modulation unit, a distance sensor, and a driver assistance system. The light source may include a plurality of light emitting diodes configured for emitting light in a visible wavelength range to illuminate surroundings of the vehicle, and interior of the vehicle, or both the surroundings and the interior. The modulation unit may be configured for modulating the emitting of the light by the light source with a frequency high enough so that the modulation of the light is substantially not perceivable by a person. The distance sensor may be configured for detecting modulated light emitted by the light source and reflected by an object, and for generating a distance signal relating to a distance of the object. The driver assistance system may be configured for providing driver assistance on the basis of the distance signal.

According to another implementation, a communication system for a vehicle is provided. The communication system may include a light source, a modulation unit, a vehicle information transfer system, a detector, and a driver assistance system. The light source may include a plurality of light emitting diodes configured for emitting light in a visible wavelength range to illuminate surroundings of the vehicle, an interior of the vehicle, or both the surroundings and the interior. The modulation unit may be configured for modulating the emitting of the light by the light source with a frequency high enough so that the modulation of the light is substantially not perceivable by a person. The vehicle information transfer system may include an information processing unit configured for controlling the modulation of the light in such a way that the emitted light is modulated in dependence on a predetermined information to send the information. The detector may be configured for detecting modulated light emitted by another vehicle and for sending out a light signal being demodulated by the information processing unit to obtain received information included in the detected modulated light. The driver assistance system may be configured for providing driver assistance on the basis of the received information.

According to another implementation, a vehicle illumination system is provided. The vehicle illumination system may include a light source, a modulation unit, a detector configured for detecting light, a range finding unit, and an information transfer unit. The light source may include a plurality of light emitting diodes configured for emitting light in a visible wavelength range to illuminate the surroundings of the vehicle, an interior of the vehicle, or both the surroundings and the interior. The modulation unit may be configured for modulating the emitting of the light by the light source with a frequency high enough so that the modulation of the light is substantially not perceivable by a person. The range finding unit may be configured for determining a distance to an object on the basis of a distance signal generated by the detector in response to detecting light emitted by the light source and reflected by the object, the light being modulated at a first frequency. The information transfer unit may be configured for sending predetermined information. The information transfer unit may be further configured for controlling the modulation unit so that emitted light is modulated at a second frequency different from the first frequency in dependence on the predetermined information. The information transfer unit may be further configured for receiving information by demodulating a light signal given out by the detector in response to detecting modulated light emitted by another vehicle.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
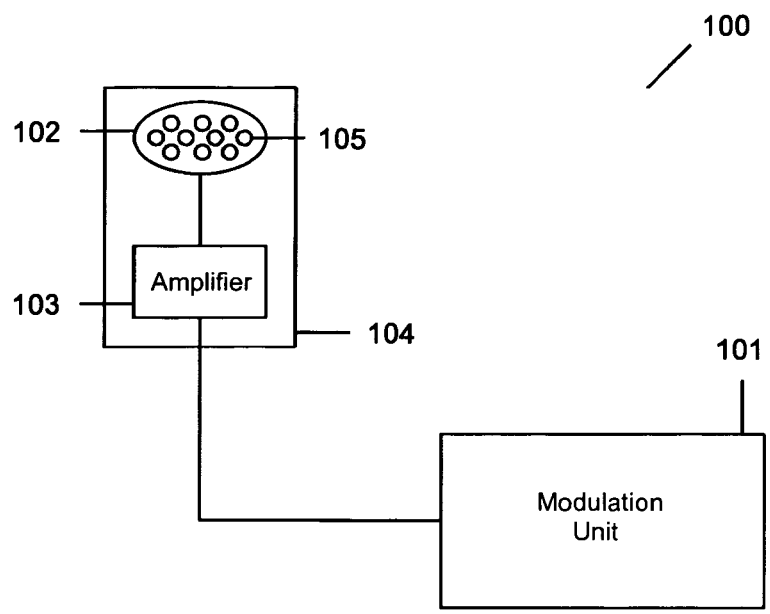
FIG. 1 is a schematic diagram of an example of a vehicle illumination system according to one implementation.

FIG. 1 is a schematic diagram of an example of a vehicle illumination system 100 according to one implementation. The vehicle illumination system 100 may include a modulation unit 101, a light source 102, and a power amplifier 103. The light source 102 and the power amplifier 103 may be included in an illumination unit 104. The light source 102 may include light emitting diodes 105. The modulation unit 101 may also be part of the illumination unit 104. The illumination unit 104 may be configured and shaped so that it can be included at various different positions on the vehicle to illuminate the vehicle. The illumination unit 104 may for example be formed as headlights to illuminate an area substantially in front of the vehicle, or as taillights for illuminating an area behind the vehicle, or as interior lights for illuminating the interior of the vehicle. Accordingly, multiple vehicle illumination systems 100 may be disposed in a vehicle. Other uses for which the illumination system 100 may be employed include, but are not limited to, fog lights, high beams, turn lights, brake lights, back-up lights, side lights, and other exterior lights and light sources disposed on a vehicle, as well as various combinations of the foregoing. As described below, the same light source 102 may be utilized to illuminate the vehicle interior and/or surroundings and to provide modulated light for other applications.

Modern vehicles may for example be equipped with night design interior lights, which illuminate substantially the vehicle interior during travel. In accordance with the present teachings, a modulated interior light may thus provide illumination of the vehicle interior and serve as a modulated light source. In the case of a vehicle headlight, the headlight provides illumination of the road and the surroundings to increase visibility for the driver during the night, and it also increases the visibility of the vehicle for oncoming traffic during the day. Simultaneously, the light emitted by such a vehicle headlight may be modulated as described below so that it may be utilized for range finding or an information exchange. It is advantageous to utilize a vehicle headlight in combination with range finding, since objects in the path or close to the path of the vehicle can be identified. In the case of a vehicle taillight, a vehicle illumination system 100 utilizing a vehicle taillight as a light source 102 has the advantage that during day and night, visibility of the vehicle is improved for other vehicles following the vehicle. Simultaneously, as described below, the modulated light provided by the vehicle taillight may be used for range finding, e.g., in park assist system applications, or to detect the distance to a following vehicle, or to transmit information to a following vehicle. If the light source 102 comprises multiple vehicle lights, such as a vehicle taillight, a vehicle headlight and a vehicle interior light, each of the vehicle lights may be modulated by its own modulation unit 101, or a combination of the lights or all the lights may be modulated by the same modulation unit 101. The various lights may be modulated with different frequencies, depending on the application, for example three frequencies for range finding and one frequency for information transfer.

The light source 102 may include a plurality of light emitting diodes 105 emitting light in the visible wavelength range. Light emitting diodes 105 may be configured such that they can be modulated with high frequencies. In modern vehicles, light emitting diodes 105 are often provided to illuminate the rear of the vehicle, and light emitting diode systems are now available as vehicle headlights to illuminate an area in front of the vehicle. Light emitting diodes 105 may also be utilized as a vehicle interior light. Modulation of the light emitted from such light sources 102 with a high frequency makes these light sources 102 not only suitable for illumination, as they emit light in the visible wavelength range, but makes them also usable for other applications such as range finding and information transfer without the need to provide additional modulated light sources. If the light emitting diodes 105 are modulated at high frequency, such a modulation is not perceivable by a person since the eye cannot follow such high frequencies. Yet the overall power emitted by the light emitting diodes 105 may be reduced. Accordingly, more light emitting diodes 105 may be provided to achieve the same power of emitted light as without modulation. The light emitting diodes 105 emit light in the visible wavelength range, yet as it is generally known, they may also emit small amounts of light in other wavelength ranges, such as infrared or UV. The light emitting diodes 105 may be configured to mainly emit light in the visible wavelength range, e.g., 380 to 780 nm, so that the emitted light may be utilized to illuminate the surroundings or the interior of the vehicle, and may furthermore be modulated to provide a versatile light source 102.

The light source 102 may include a plurality of infrared light emitting diodes. These infrared light emitting diodes (IR-LED) may be provided additionally, which has the advantage that applications of the light source 102, such as range finding and information transfer, may also be available when the light source for illuminating the vehicle is switched off. While the light source emitting in the visible wavelength range is switched off, the infrared light emitting diodes may continue to emit modulated light, which is then available for the above-mentioned applications. A further advantage of IR-LEDs is that detectors are available that are very sensitive to IR-light, where, with the same emitted light intensity, a wider range for, as an example, a range finding system may be achieved.

The frequency of modulation of the light will depend on the application, yet as noted above the light is modulated high enough that it is substantially not perceivable by a person. Such a vehicle illumination system 100 has the advantage that no additional illumination unit needs to be provided to provide modulated light. Therefore, no additional space is required, and production costs are kept low. By means of the modulation unit 101, the light may be modulated at different frequencies, which makes the vehicle illumination system 100 according to the invention very versatile, as it may be utilized by several applications. Such applications may include distance measurements/range finding or information transfer between vehicles.

That the modulation of the light is substantially not perceivable by a person generally means that the modulation frequency is so high that no flickering of the light source 102 can be observed. When looking at the light source 102, a person can therefore not tell whether the light is modulated or not. Yet, the person may be able to tell when the modulation is turned on or off, since in that case, the average intensity emitted by the light source 102 may decrease or increase, respectively.

As noted above, the vehicle illumination system 100 may further include a power amplifier 103. The power amplifier 103 receives a modulation signal from the modulation unit 101 and modulates the light emission of the light source 102. The power amplifier 103 is utilized to drive, for example, the light emitting diodes 105. The modulation unit 101 supplies a modulation signal, which may contain one or more modulation frequencies, to the power amplifier 103, which then modulates the power supplied to the light source 102. The power amplifier 103 and the light source 102 may be included in one mounting module or they may be separate from each other, or all three components, power amplifier 103, modulation unit 101 and light source 102, may be included in a single module. Such a single module has the advantage that a compact light source is provided that only needs to be supplied with power and information relating to the modulation of the light emitted by the light source 102.

The modulation signal supplied to the power amplifier 103 by the modulation unit 101 may for example be in the form of a 20 MHz AC signal, or in the form of any other high frequency modulated signal. In one example, the frequency of the modulated signal is in the range from 0.1 to 50 MHz. In another example, the frequency of the modulated signal is in the range from 1 to 25 MHz. The power amplifier 103 generally provides current and voltage to the light emitting diodes 105 of the light source 102, whereby the light emitting diodes 105 emit light mainly in the visible wavelength spectrum to illuminate the vehicle. In a conventional vehicle illumination system, constant power is provided to the light emitting diodes 105, or the power is periodically switched on and off with very low frequency, e.g., in a turn light. The only purpose of conventional illumination systems is thus to illuminate the vehicle, or to indicate to other vehicles. With the vehicle illumination system 100 of the present example, the power amplifier 103 modulates the supply of power to the light source 102 with the modulation signal received from the modulation unit 101. Accordingly, the light emitted by the light emitting diodes 105 is modulated, e.g., at 20 MHz or at some other frequency or frequencies such as may for example be included in one of the above-mentioned ranges of 0.1 to 50 MHz and 1 to 25 MHz. As noted above, a modulation with such a high frequency is not perceivable by a person. Light emitting diodes 105 are particularly advantageous for such an application because they can be switched very quickly. The emitted light may also be modulated with plural frequencies in the range of, for example, 0.1 to 50 MHz or 1 to 25 MHz. The particular frequency, or the number of frequencies, at which the light is modulated depends on the application. For example in a range finding system, several frequencies may be utilized since these frequencies correspond to different distant ranges, for which a unique distance may be determined. The emitted light may be modulated with additional frequencies in order to provide one or more channels for the transfer of information between vehicles. The use of these frequency ranges has the advantage that such a modulation is not visible to a person and it enables range finding and information transfer.

As evident from the foregoing, the light emitted by the vehicle illumination system 100 may now serve several functions. The light may still illuminate the vehicle surroundings or interior, but the light may additionally be utilized as a light source by other systems, such as range finding systems or information transfer systems that require a modulated light source. Depending on the modulation, the brightness of the light source 102 may be lower than the brightness of a comparable light source which does not provide modulated light. Such a decrease in brightness may be compensated for by using a larger number of light emitting diodes 105.

The vehicle illumination system 100 may be easily integrated in modern vehicles without the requirement of major modifications, as modern vehicles often already include light emitting diode illumination systems. The integration of the vehicle illumination system 100 is thus cost effective and requires only little additional space. In more and more countries, it is now required to permanently turn on the vehicle headlights and taillights. In this way, modulated light for range finding or information transfer may always be provided when the vehicle is in motion. Alternatively, as noted above, additional infrared light emitting diodes may be provided in the light source 102 for providing modulated infrared light for range finding and/or information transfer when the vehicle illumination is turned off while the vehicle is in motion.

It will be appreciated by persons skilled in the art that the system of FIG. 1 may comprise further components not shown in FIG. 1, such as systems controlling the modulation unit 101, a power source supplying the power amplifier 103 with power, and the like.

Figure 2:
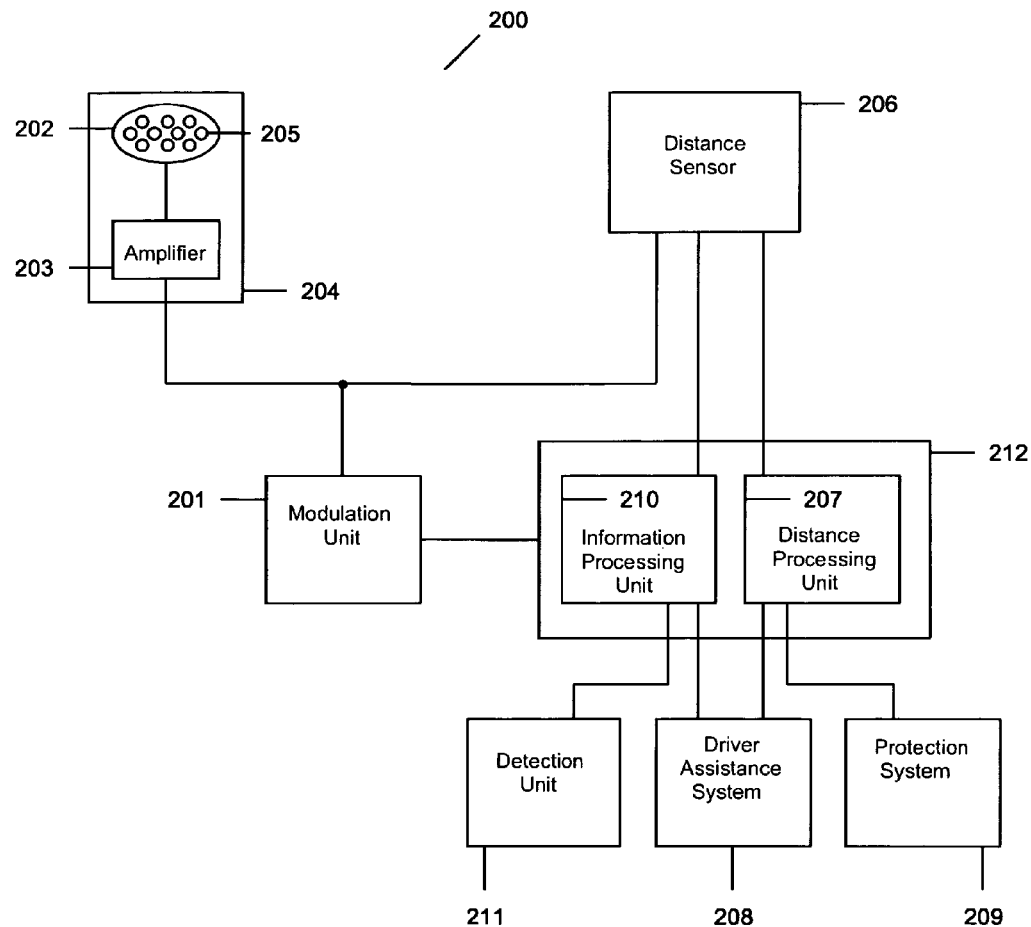
FIG. 2 is a schematic diagram of an example of a vehicle illumination system according to another implementation.

FIG. 2 is a schematic diagram of an example of a vehicle illumination system 200 according to another implementation. The vehicle illumination system 200 may include a modulation unit 201, a light source 202 and a power amplifier 203. The light source 202 and the power amplifier 203 may be integrated in an illumination unit 204. The light source 202 may include light emitting diodes 205. The vehicle illumination system 200 may include a vehicle range finding system that includes a distance sensor 206. The distance sensor 206 receives the modulation signal from the modulation unit 201 as a reference signal. Modulated light emitted by the light emitting diodes 205 illuminates, e.g., an area in front of the vehicle, whereby the modulated light is reflected off of an object on the road or on the road side, such as another vehicle in front or a tree beside the road. The distance signal generated by the distance sensor 206 generally depends on the distance between the object and the distance sensor 206. Furthermore, the distance signal may depend on the positioning of the light source 202 relative to the object and the distance sensor 206. The light requires a certain amount of time to travel from the light source 202 to the object and back to the distance sensor 206. Accordingly, there is a phase shift between the modulation signal supplied as a reference signal and the modulation of the detected light. The distance sensor 206 generates a signal proportional to the phase shift and thus to the distance traveled by the light. The distance sensor 206 may comprise a pixel array and optics, so that an image is obtained from the area that the distance sensor is aimed at, with distance information available for each pixel. Examples of such distance sensors 206 include a solid state time-of-flight range camera by the Swiss CSEM Inc., or a PMD 3D video range camera such as produced by PMD technologies, or others. Such a distance sensor 206 only requires little space and may be mounted behind the windscreen of the vehicle to aim at an area in front of the vehicle or at the back of the vehicle to aim at an area behind the vehicle, or at some place in the passenger compartment to detect objects inside the passenger compartment. Modern vehicles often already include several camera systems, for example six separate cameras.

A certain modulation frequency of the light is associated with a certain range in which a unique distance signal can be obtained from the distance sensor 206. If the object is too distant, a larger phase shift may occur, in which case the distance sensor 206 may no longer be able to uniquely identify the distance of the object. Accordingly, different modulation frequencies may be utilized to modulate the emission of light by the light source 202 so that the desired range-finding range is achieved. For a modulation with 1 MHz, the wavelength of the modulation is 300 meters resulting in a 150-meter usable range-finding range. For 16 MHz modulation, the range is 9.4 meters. For the use inside the vehicle the modulation frequency may thus be higher, whereas for illuminating the surroundings of the vehicle lower modulation frequencies may be preferred. Alternatively, the light may be modulated with plural frequencies simultaneously or alternatingly. For example modulation with 5, 10 and 20 MHz may be used for range finding. The vehicle illumination system 100 may also detect if another vehicle is equipped with a range finding system utilizing a similar light modulation frequency for range finding. In such a case, the modulation frequency may be shifted.

A distance signal is provided by the distance sensor 206 to a distance processing unit 207. The distance sensor 206 and the distance processing unit 207 may be provided in one module. The distance processing unit 207 may process the distance signal to obtain an image of the area monitored by the distance sensor 206, which may then be displayed to the driver of the vehicle together with information relating to the distance of displayed objects. Because generally, the shape of the vehicle as well as the position of the light source 202 and the distance sensor 206 are known, the distance of an object reflecting the modulated light to the outer perimeter of the vehicle may be calculated by the distance processing unit 207. Images with distance information may be recorded at frequencies up to 100 Hz. This enables the distance processing unit 207 to determine the relative velocity between the vehicle and an object. Such information may then be provided to a driver assistance system 208. The driver assistance system 208 may initiate a slowing down of the vehicle, or an emergency braking, or the like.

Information relating to the position and/or distance of objects, particularly of objects in the passenger compartment, may be provided to a passenger protection system 209. In case of an emergency such as a collision, the passenger protection system 209 may then activate protection equipment such as a restraint system or airbags at passenger positions, which the distance processing unit 207 may determine from the supplied distance signal indicating that a passenger is present.

The distance processing unit 207 may also analyze the signal provided by the distance sensor 206 to determine whether an adjustment of the modulation frequency is necessary, such as in a case of an inadequate range-finding range or in the case that modulated light is detected from a range finding system of another vehicle. The distance processing unit 207 may then control the modulation of the emitted light by means of the modulation unit 201.

The distance sensor 206 may also provide a signal to an information processing unit 210. Another vehicle equipped with a substantially similar vehicle illumination system may drive in front of the vehicle and send out information in the form of modulated light emitted by this other vehicle's taillights. This modulated light is then also detected by the distance sensor 206. A simple intensity signal possibly containing multiple pixels may be supplied to the information processing unit 210 for analysis. A modulation with a particular frequency, say 8 MHz, may correspond to a particular information, such as information that the vehicle in front is braking strongly. The information processing unit 210 may then analyze the signal supplied by the distance sensor 206 to determine whether the modulation frequency of 8 MHz is contained in the signal. If positive, the information processing unit 210 may then provide the information that the vehicle in front is braking strongly to the driver assistance system 208, which may then take an appropriate action in response. Alternatively, more complex information may be received from the other vehicle by means of more complex modulation of the emitted light, such as multiple frequency modulation or phase shift modulation. That information may for example comprise a velocity of the other vehicle, or how fast the velocity of the other vehicle is changing.

The vehicle illumination system 200 may also transmit information to other vehicles. The information processing unit 210 may receive information relating to the status of the vehicle from a status detection unit 211. This could be a very simple information, such as that a certain event has occurred, e.g., the vehicle is braking with a predetermined deceleration. Yet it could be more complex information, such as the vehicle velocity or the change in the vehicle velocity, or other vehicle status information. The information processing unit 210 sends a control signal to the modulation unit 201, which generates a corresponding modulation signal. The modulation signal may be generated in accordance with a predefined standard so that information transfer systems of other vehicles can recognize and demodulate the received signal. The information processing unit 210 and the distance processing unit 207 may be included in a processing module 212. The processing module 212 may combine the modulation control signals of the information processing unit 210 and the distance processing unit 207 and submit these signals to the modulation unit 201. Alternatively, the information processing unit 210 and the distance processing unit 207 may both supply control signals to the modulation unit 201, which then generates a modulation signal with several modulation frequencies.

The vehicle illumination system 200 has several advantages. Only one light source 202 is necessary to provide illumination of the vehicle and modulated light for range finding and information transfer. Also only one distance sensor 206 is necessary for range finding and information transfer. As a consequence, the vehicle illumination system 200 is relatively compact and cost efficient. Particularly since modern vehicles are already provided with light sources in the form of light emitting diodes, the additional costs of integrating the vehicle illumination system 200 are reduced.

As noted above, the distance processing unit 207 may be provided for receiving and processing the distance signal from the distance sensor 206 to obtain information relating to the distance and/or position of an object such as another vehicle. If the distance sensor 206 is in the form of a camera with multiple pixels and an optical system, an image of an area observed by the distance sensor 206 may be obtained. For each pixel in the image, phase information relating to the distance of an object imaged onto this pixel may be provided. As a result, an image of an area may be obtained with information about the distance of the objects in the image to the distance sensor 206. The distance processing unit 207 may thus derive the distance and/or position of one or more objects in the observed area from the distance signal of the distance sensor 206. The distance sensor 206 may be mounted on the rear of the vehicle to detect modulated light emitted by the vehicle taillight, or in the interior of the vehicle to detect light emitted by a vehicle interior light, or on the front of the vehicle, for example below the windscreen, to detect light emitted by the vehicle headlights. Detected objects may comprise another vehicle in front of or behind the vehicle, persons in proximity of the vehicle, trees on the side of the road, curbs or posts, or objects inside the vehicle such as passengers, luggage or other objects. Furthermore, the driver assistance system 208 may be supplied by the distance processing unit 207 with information relating to the distance and/or position of the object, or multiple objects. That way, by illuminating the surroundings of the vehicle with modulated light, detecting the modulated light and deriving distance information from the detected light, a driver may be provided with driver assistance. Such a driver assistance system 208 may for example include an adaptive cruise control, which keeps the vehicle at a constant velocity, and when the vehicle approaches another vehicle, it slows the vehicle down so that a constant distance is held between the two vehicles. Other driver assistance functions may include an automatic emergency brake being applied before the vehicle hits an obstacle, or pedestrian protection.

The distance sensor 206 may for example be a photonic mixer device. Such a device has the advantage that it can provide an image with the resolution of e.g., 160×120 pixels, and distance information with a unique range of 150 meters. In another implementation, the distance sensor 206 may be any 3D camera based on a time-of-flight principle. The above-mentioned distance sensors 206 have the advantage that they are compact and available at relatively low costs. Only one sensor needs to be provided for both information transfer and range finding. If, for example, no range finding system is provided, the detector 206 may be a simple photo detector, such as a photo resistor, a photo diode or the like. This again has the advantage that system costs are kept low.

In another aspect, the vehicle illumination system 200 includes a vehicle information transfer system. The information transfer system includes the information processing unit 210, which controls the modulation of the light in such a way that the emitted light is modulated in dependence on a predetermined information to send the information. The information may for example include information about the status of the vehicle, which may be acquired by the status detection unit 211. The information processing unit 210 then sends a signal to the modulation unit 201, which causes the modulation unit 201 to modulate the emitted light in a predetermined way. The modulation of the light may be as simple as the modulation with one frequency, yet it may also comprise a more complex frequency modulation or phase shift modulation or others. The modulated light is then emitted by the light source 202 to transmit the information. The modulated light comprising the information may then be detected by another vehicle, or a fixed station or the like. The vehicle illumination system 200 may utilize the detector 206 to detect modulated light and produce a light signal, where the information processing unit 210 demodulates the light signal to obtain received information. Modulated light emitted by another vehicle in a similar fashion and including information may thus be detected by the detector 206 and demodulated by the information processing unit 210 to retrieve the information. To that end, a substantially similar vehicle illumination system disposed in another vehicle receives the emitted modulated light and emits modulated light which is received by the detector 206, whereby an information transfer between the two vehicles is enabled. The information sent may include, for example, information relating to the velocity and/or the change in velocity of the vehicle. This has the advantage that by emitting modulated light by the vehicle illumination system 200, another vehicle can be informed about the current speed or an acceleration or deceleration of the vehicle. Another vehicle that receives this information and is driving behind the vehicle transmitting the information may then adapt its velocity to the velocity of the vehicle, whereby a safe distance can automatically be held between the two vehicles. Similarly, modulated light emitted by another vehicle driving in front of the vehicle may be detected and demodulated to retrieve information. The driver assistance system 208 may operate to utilize at least part of the received information so as to provide appropriate driver assistance. If the received information contains the velocity of the vehicle in front, then the driver assistance system 208 may adjust the vehicle velocity accordingly to maintain a safe distance.

In an example, when the status detection unit 211 detects a braking of the vehicle with a predetermined deceleration, the emitted light is modulated with a predetermined frequency. If the driver of the vehicle brakes very hard, the status detection unit 211 gives this information to the information processing unit 210, which controls the modulation so that light modulated with the predetermined frequency is emitted by the vehicle illumination system 200. This light may then be detected by a following vehicle, and analyzed. When a modulation of the light with the predetermined frequency is detected, the system in the other vehicle knows that the vehicle in front is braking very hard. It may then initiate actions, such as supplying the information to a driver assistance system which initiates an emergency braking. Such an arrangement has the advantage that by transferring information by means of modulated light between vehicles, severe accidents may be prevented since a safe distance between vehicles and fast reaction times for emergency braking are ensured.

Figure 3:
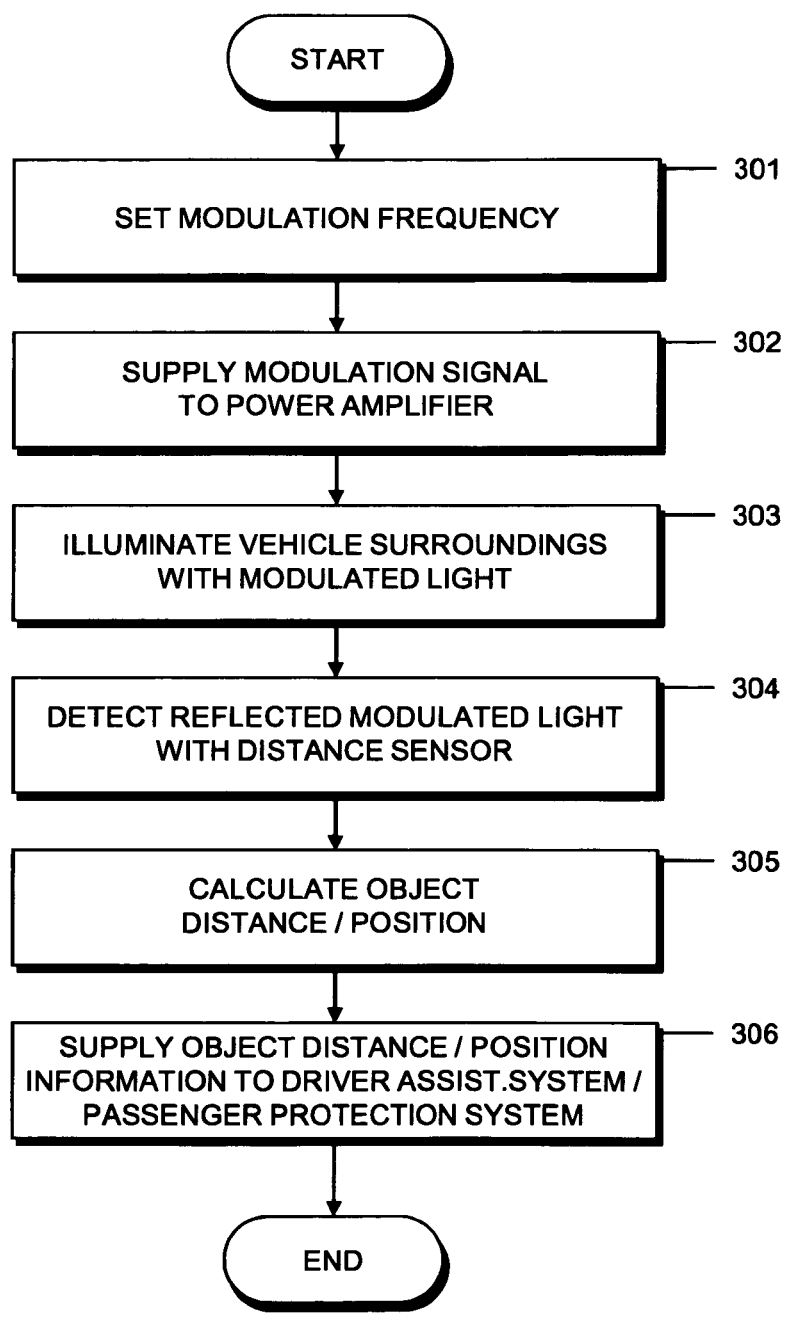
FIG. 3 is a flow diagram of an example of a method for illuminating a vehicle.

FIG. 3 is a flow diagram of an example of a method for illuminating a vehicle. In a first step 301, a modulation frequency is set. The modulation frequency may for example be determined by a distance processing unit 207 that supplies a control signal to a modulation unit 201 (FIG. 2). A modulation signal with the predetermined modulation frequency is then generated by the modulation unit 201. In the next step 302, the modulation signal is supplied to a power amplifier, such as the power amplifier 203. The power amplifier is connected to a power source, such as a vehicle battery, and generates high AC current with the preset modulation frequency. The current is used to drive a light source, such as the light emitting diodes 205. In the next step 303, the vehicle surroundings are illuminated with modulated light, which is emitted by the light source. Again, an area in front or behind or on the sides of the vehicle may be illuminated, or the vehicle interior. The emitted light is modulated with a frequency which is high enough so that the modulation of the light is substantially not perceivable by a person. This means that the frequency is high enough so that no flickering of the light source is visible by a person. A decrease in a perceived intensity of the light source may be accompanied by the modulation, yet that makes the frequency modulation of the light not perceivable by a person. The emitting of light may, for example, be utilized to illuminate an area in front and/or behind the vehicle by means of a headlight and/or a taillight, respectively, where the headlight and the taillight include the light emitting diodes 205. The emitting of light may further be utilized to illuminate the vehicle interior by means of a vehicle interior light that includes light emitting diodes 205. Any combination of such illumination is possible, as long as the light is modulated with a frequency that is substantially not perceivable by a person. Such a method of illuminating a vehicle has the advantage that both illumination of the vehicle is provided as well as a light source which may be utilized in combination with other applications such as range finding systems or information transfer systems, as described above.

The modulated light is then reflected by an object. Such an object may be another vehicle, a tree on the side of the road, a curb besides the vehicle, or an object inside the vehicle, or the like. Generally, part of the modulated light is reflected back to the vehicle. In the next step 304, the reflected modulated light is detected by a detector such as the distance sensor 206 illustrated in FIG. 2. If several light sources emitting modulated light are provided in the vehicle, a distance sensor may be provided for each of those light sources. A distance sensor may be provided for the front of the vehicle, for the rear of the vehicle, for the sides of the vehicle and for the vehicle interior. The distance sensor detects the reflected light and is generally also provided with a reference signal in form of the modulation signal as described above. The distance sensor generates a distance signal comprising amplitude and phase information of the light detected by multiple pixels of the distance sensor. The distance and/or position of objects is subsequently calculated in step 305. The distance signal may be evaluated and objects in the field of view of the distance sensor may be identified as well as their distance to the vehicle. The distance signal generated by the distance sensor may be processed by means of a distance processing unit 207 to obtain information relating to the distance and/or position of the object. If the distance sensor comprises multiple pixels, then the distance and/or position of multiple objects may be detected simultaneously.

The distance and/or position information is then in step 306 supplied to a driver assistance system 208 or a passenger protection system 209 (FIG. 2). As described above, these systems may take the necessary actions in accordance with the information supplied. Providing driver assistance may include such steps as slowing down the vehicle, initiating an emergency braking, providing visual or audible information to the driver about objects on the road or in close proximity of the vehicle, highlighting objects on a display system for example for night vision applications, providing an automatic velocity adjustment of the vehicle by means of an adaptive cruise control system or the like. The information relating to the distance and/or position of the object may also be supplied to a passenger protection system to control the deployment of passenger protection equipment. Such passenger protection equipment may for example be a restraint system, or an airbag system or the like. By emitting modulated light by means of a vehicle interior light, the distance sensor may detect the position and/or distance of objects inside the passenger compartment of the vehicle. If it is for example detected that a certain seat in the vehicle passenger compartment is not occupied by a passenger, then the airbag may not be activated for that position in case of a collision. Similarly, if just a small object is detected on a seating position, the passenger protection system may determine not to deploy an airbag for that position, e.g., so as not to harm a child in a baby seat. By providing modulated light inside the passenger compartment in combination with a range finding system, passenger safety can be increased.

Figure 4:
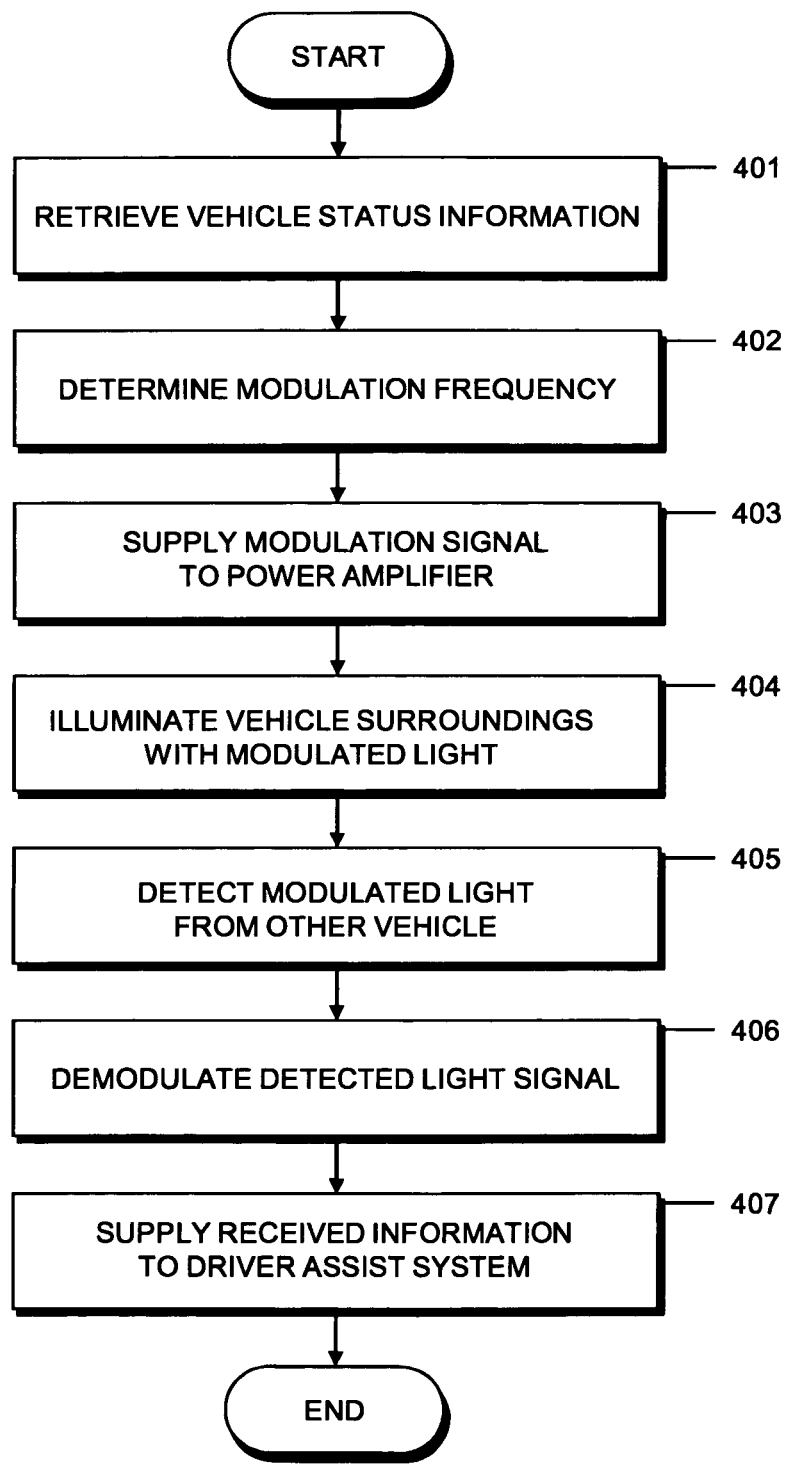
FIG. 4 is a flow diagram of another example of a method for illuminating a vehicle.

FIG. 4 is a flow diagram of another example of a method for illuminating a vehicle. In a first step 401, a vehicle status information is retrieved, e.g., by a status detection unit 211 (FIG. 2). Depending on the retrieved status information, a modulation frequency is determined in step 402. A modulation frequency may be determined based on the speed of the vehicle or the acceleration/deceleration of the vehicle, or a predetermined modulation frequency may be set for a particular event. The information processing unit 208 may determine the modulation frequency based on the information supplied by the status detection unit 211 and may then send a control signal to the modulation unit 201, the control signal including the determined modulation frequency. The modulation unit 201 then synthesizes a modulation signal in accordance with the control signal. In the next step 403, the modulation signal is supplied to a power amplifier. The power amplifier then supplies power to a light source, such as the light emitting diodes 205, which is modulated with the modulation signal. The vehicle surroundings are then illuminated with the modulated light in step 404. The modulated light illuminates the vehicle surroundings and provides the vehicle status information, according to which the light was modulated. A corresponding system in another vehicle may detect the modulated light and retrieve the vehicle status information. The other vehicle may also supply its status information by means of modulated light. The modulated light from the other vehicle is detected in the next step 405, for example by using a simple photo detector or a distance sensor 206. The light signal generated by the detector detecting the modulated light is then demodulated in step 406, e.g., by the information processing unit 210, to retrieve the status information sent by the other vehicle. In step 407, the information retrieved from the detected signal is then supplied to a driver assistance system. The driver assistance system may now perform a necessary action. If the detected light was received from a vehicle in front, and contains the information that the vehicle in front is strongly braking, the driver assistance system may then for example initiate braking of the vehicle, or even an emergency braking or it may give the driver a warning. Accordingly, with the method of FIG. 4, an illumination of the vehicle surroundings or the vehicle interior is provided as well as an exchange of data between different vehicles.

As evident from the foregoing, the method may entail controlling the modulation of light by means of an information processing unit in such a way that the emitted light is modulated in dependence on a predetermined information in order to send the information. The way in which the light is modulated in order to send a particular information has to be predetermined, for example by way of a standard. A certain modulation frequency may for example correspond to a certain deceleration of the vehicle. The information processing unit receives the information that is to be sent and modulates the light with this information according to the standard. For instance, the controlling of the modulation may be performed in such a way that, when the vehicle is braking with a predetermined deceleration, the light is modulated with a predetermined frequency. As an example, the light may be modulated at 5, 10 and 20 MHz for range finding and at 8 MHz for indicating a strong braking of the vehicle. Such a modulation is very simple and can be easily picked up by a following vehicle, which can then take the necessary actions. The method may thus provide the advantage that the reaction time for emergency braking is reduced, thereby reducing the number of accidents.

As also evident from the foregoing, the method may further entail detecting modulated light emitted by a substantially similar vehicle illumination system disposed in another vehicle by means of a detector giving out a light signal, and demodulating the light signal using the information processing unit for obtaining a received information such as information relating to the velocity and/or change in velocity of a vehicle from which the detected modulated light originates. Furthermore, if multiple vehicles equipped with such a system are driving behind each other, and if the front vehicle brakes, that information may be sent to the next vehicle, which in turn relays this information to the next vehicle and so on, until the last vehicle in the row of vehicles receives this information. The light emitted by the vehicle illumination systems may be modulated at slightly different frequencies for the different vehicles to prevent interference and misinterpretation of the signals. Information is preferably transferred between two vehicles driving directly behind each other, where good information transfer is ensured since in most situations, with the detector on the front/rear of a vehicle being in the line of sight of the light source in form of a taillight/headlight of the other vehicle, respectively. In such situations, it may also be determined from which vehicle the detected modulated light originates by the amplitude of the detected modulated light signal and the position of the detector.

Figure 5:
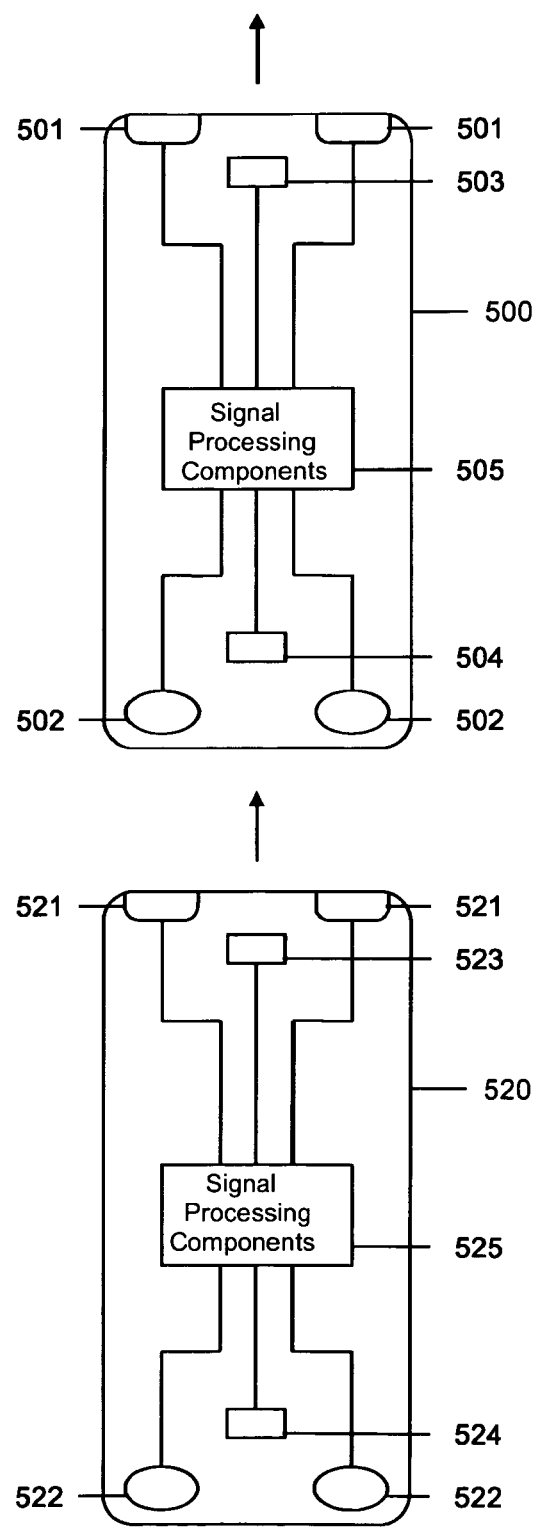
FIG. 5 is a schematic top view of two vehicles equipped with respective vehicle illumination systems according to another implementation.

FIG. 5 illustrates the use of a vehicle illumination system similar to the system of FIG. 2 in two vehicles. A first vehicle 500 includes two headlights 501 and 501, two taillights 502 and 502, a front distance sensor 503, a rear distance sensor 504, and signal processing components 505. The headlights 501 and the taillights 502 may each include a light source with light emitting diodes and a power amplifier. The signal processing components 505 may include components such as an information processing unit or a distance processing unit, as well as a status detection unit, a driver assistance system, and passenger protection system components. A second vehicle 520 is similarly provided with headlights 521 and 521, taillights 522 and 522, a front sensor 523 and a rear sensor 524, and signal processing components 525. A modulation unit may be included in either the signal processing components 505; 525 or the headlights/taillights 501, 502; 521, 522.

The headlights and taillights 501, 502; 521, 522 of both vehicles 500 and 520 are utilized to illuminate the area in front/behind the vehicles 500 and 520, respectively. This may be the case even during the day, as it is already mandatory in several countries to turn on vehicle lights during the day. The light emitted by the headlights 501, 521 and the taillights 502, 522 is modulated, so that the light may be used for range finding. Light reflected by objects in front, behind or on the sides of the first vehicle 500 is detected by either the front sensor 503 or the rear sensor 504, or the front sensor 523 and the rear sensor 524 with respect to the second vehicle 520. The range finding system of the second vehicle 520 may thus determine the distance to the first vehicle 500 by means of modulated light emitted by the headlights 521, reflected off the first vehicle 500 and detected by the front sensor 523. To prevent interference between both range finding systems of the first vehicle 500 and the second vehicle 520, the systems may use different modulation frequencies. By using the modulated light emitted from the headlights 501, 521 of the first vehicle 500 and the second vehicle 520 for range finding, the first vehicle 500 may identify hazardous objects in its driving path or possible hazards on the side of the road, of which the driver of the first vehicle 500 may be warned or appropriate actions may be taken by a driver assistance system of the first vehicle 500, whereas the second vehicle 520 is enabled to accurately determine any changes in the distance to the first vehicle 500, whereby the second vehicle 520 can automatically keep a safe distance to the first vehicle 500, e.g., by a driver assistance system.

Furthermore, if the first vehicle 500 brakes strongly, the light emitted by the headlights 501 and the taillights 502 of the first vehicle 500 is modulated at a predetermined frequency, which is different from the modulation frequency for range finding. Mainly, the modulated light emitted by the taillights 502 is detected by the front sensor 523 of the second vehicle 520, and analyzed, where it is determined that the predetermined modulation frequency is present in the detected light. By this means, the second vehicle 520 obtains the information that the first vehicle 500 is braking strongly. Thus, the second vehicle 520 may take the necessary actions, such as sending the information to a driver assistance system which initiates a strong braking of the second vehicle 520, or displaying a warning to the driver, or the like. Furthermore, the light emitted by the second vehicle 520 is also modulated with this predetermined frequency, so that vehicles following the second vehicle 520 may also obtain the information. In this manner, information can be relayed from the front vehicle 500 to the last vehicle of a line of vehicles. Since all vehicles obtain the information that the front vehicle 500 is braking strongly, severe rear end collisions can be prevented. It is possible to use the same modulation frequency for transferring the information between different vehicles, because in situations where this information transfer is relevant, the taillights 502 of the first vehicle 500 and the front sensor 523 of the second vehicle 520 are in a line of sight. Thus in this case, the front sensor 523 will mainly detect light emitted by the taillight 502 of the first vehicle 500 driving in front. Light from other vehicles, which may drive in front of the first vehicle 500, will only be received with very low intensity, and may thus not interfere with the information transfer. Alternatively, different frequencies may be utilized to transfer the information between different vehicles. Also, different frequencies may be utilized to indicate different decelerations, in accordance with a predefined standard. In this way, the second vehicle 520 would precisely know how strong it has to brake in order to keep a safe distance to the first vehicle 500. Further implementations of the invention may be envisioned, such as transferring more complex data between the vehicles including vehicle velocity and the like, or modulating the light emitted by an indicator when turning so as to detect hazardous objects in the vehicle turning path, etc.

It will be understood, and is appreciated by persons skilled in the art, that one or more processes, sub-processes, or process steps described in connection with FIGS. 1-5 may be performed by hardware and/or software. If the process is performed by software, the software may reside in software memory (not shown) in a suitable electronic processing component or system such as, one or more of the functional components or modules schematically depicted in FIGS. 1 & 3. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Summarizing, the vehicle illumination system of the present invention provides an illumination system which may be easily integrated in modern conventional vehicles, does not require large amounts of additional space and is rather cost effective. It is also very versatile, as the light emitted by the illumination system may be utilized for a wide range of applications.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A vehicle illumination system, comprising:
 a light source configured for emitting light in the visible wavelength range for illuminating surroundings of a vehicle, an interior of the vehicle, or both the surroundings and the interior;
 a modulation unit configured for modulating the emitting of the light of the light source, where the emitted light is modulated with a frequency that is high enough so that the modulation of the light is substantially not perceivable by a person;
 a sensor that detects modulated light emitted by the light source and provides a received signal indicative thereof;
 a vehicle range finding system that receives and processes the received signal and generates a distance signal relating to the distance of the object; and
 a vehicle information transfer system that includes an information processing unit, which receives and processes the received signal and controls the modulation of the light in such a way that the emitted light is modulated in dependence on a predetermined information to be transmitted.

2. The vehicle illumination system of claim 1, where the light source is selected from the group consisting of a vehicle headlight, a vehicle taillight, a vehicle exterior light, a vehicle interior light, and combinations of two or more of the foregoing.

3. The vehicle illumination system of claim 1, where the light source is one of a plurality of light sources, each light source communicating with and modulated by the modulation unit.

4. The vehicle illumination system of claim 1, where the modulation unit is one of a plurality of modulation units, each modulation unit communicating with and modulating a respective one of the light sources.

5. The vehicle illumination system of claim 1, where the light source includes a vehicle headlight with light emitting diodes illuminating an area substantially in front of the vehicle.

6. The vehicle illumination system of claim 1, where the light source includes a vehicle taillight with light emitting diodes illuminating an area substantially behind the vehicle.

7. The vehicle illumination system of claim 1, where the light source includes a plurality of light emitting diodes emitting light in the visible wavelength range.

8. The vehicle illumination system of claim 1, where the light source includes a plurality of infrared light emitting diodes.

9. The vehicle illumination system of claim 1, further including a power amplifier configured for receiving a modulation signal from the modulation unit and modulating the light emission of the light source.

10. The vehicle illumination system of claim 1, where the emitted light is modulated with a frequency in the range of 0.1 to 50 MHz.

11. The vehicle illumination system of claim 1, where the emitted light is modulated with a plurality of frequencies in the range of 0.1 to 50 MHz.

12. The vehicle illumination system of claim 1, further including a distance processing unit configured for receiving and processing the distance signal from the sensor to obtain information relating to the distance and/or position of the object.

13. The vehicle illumination system of claim 12, further including a driver assistance system configured for receiving from the distance processing unit the information relating to the distance and/or position of the object.

14. The vehicle illumination system of claim 1, further including a driver assistance system, where the information processing unit is configured for sending at least part of the received information to the driver assistance system to provide driver assistance.

15. The vehicle illumination system of claim 1, where the detector is configured for receiving modulated light emitted from another vehicle whereby an information transfer between the two vehicles is enabled.

16. The vehicle illumination system of claim 1, further including a status detection unit configured for detecting a velocity of the vehicle and/or a change in velocity of the vehicle, where the information sent includes information relating to the velocity and/or the change in velocity of the vehicle.

17. The vehicle illumination system of claim 1, further including a status detection unit, where, when the status detection unit detects a braking of the vehicle with a predetermined deceleration, the emitted light is modulated with a predetermined frequency.

18. A method for illuminating a vehicle, comprising:
illuminating surroundings of the vehicle, an interior of the vehicle, or both the surroundings and the interior, with light in the visible wavelength range emitted by a light source; and
modulating the emitting of the light by utilizing a modulation unit, where the emitted light is modulated with a frequency which is high enough so that the modulation of the light is substantially not perceivable by a person, and controlling the modulation of light by utilizing an information processing unit in such a way that the emitted light is modulated in dependence on a predetermined information to send the information;
detecting with a sensor the modulated light emitted by the light source and reflected by an object, where the sensor generates a distance signal relating to the distance of the object; and
detecting with the sensor modulated light emitted by a vehicle illumination system disposed in another vehicle by utilizing a detector that generates a light signal in response to detecting the modulated light, and processing the light signal using the information processing unit to obtain a received information.

19. The method of claim 18, where illuminating includes illuminating an area in front and/or behind the vehicle by means of a headlight and/or a taillight, respectively, where the headlight and the taillight include light emitting diodes.

20. The method of claim 18, where illuminating includes illuminating the vehicle interior by utilizing a vehicle interior light including light emitting diodes.

21. The method of claim 18, further including processing the distance signal by utilizing a distance processing unit to obtain information relating to the distance and/or position of the object.

22. The method of claim 21, further including supplying the information relating to the distance and/or position of the object to a driver assistance system to provide driver assistance.

23. The method of claim 21, further including supplying the information relating to the distance and/or position of the object to a passenger protection system to control the deployment of passenger protection equipment.

24. The method of claim 18, where the controlling of the modulation is performed in such a way that, when the vehicle is braking with a predetermined deceleration, the light is modulated with a predetermined frequency.

25. The method of claim 18, further including supplying the received information to a driver assistance system, where the received information includes information relating to a velocity and/or change in velocity of a vehicle from which the detected modulated light originates.

* * * * *